United States Patent
Swift et al.

(10) Patent No.: US 6,436,502 B1
(45) Date of Patent: Aug. 20, 2002

(54) BELTS HAVING OVERLAPPING END SECTIONS

(75) Inventors: Joseph A. Swift, Ontario; Santokh S. Badesha, Pittsford; T. Edwin Freeman, Webster; Theodore Lovallo, Williamson; Edward L. Schlueter, Jr., Rochester; Constance J. Thornton, Ontario; Xiaoying Elizabeth Yuan, Fairport, all of NY (US)

(73) Assignee: Xerox Corporation, Stamford, CT (US)

( * ) Notice: Subject to any disclaimer, the term of this patent is extended or adjusted under 35 U.S.C. 154(b) by 65 days.

(21) Appl. No.: 09/695,827

(22) Filed: Oct. 26, 2000

(51) Int. Cl.⁷ .................................................. F16G 1/00
(52) U.S. Cl. ......................................... 428/60; 474/254
(58) Field of Search ........................... 474/254; 428/60; 198/844.2; 399/162

(56) References Cited

U.S. PATENT DOCUMENTS

| | | | |
|---|---|---|---|
| 4,596,540 A | * 6/1986 | F'Geppert | 474/254 |
| 5,341,194 A | 8/1994 | Haneda et al. | 355/212 |
| 5,455,136 A | 10/1995 | Yu et al. | 430/59 |
| 5,487,707 A | 1/1996 | Sharf et al. | 474/253 |
| 5,514,436 A | 5/1996 | Schlueter, Jr. et al. | 428/57 |
| 5,549,193 A | 8/1996 | Schlueter, Jr. et al. | 198/844.2 |
| 5,670,230 A | * 9/1997 | Schlueter et al. | 428/57 |
| 5,688,355 A | * 11/1997 | Yu | 156/257 |
| 5,698,358 A | * 12/1997 | Yu | 428/60 |
| 5,721,032 A | 2/1998 | Parker et al. | 428/57 |
| 6,245,402 B1 | 6/2001 | Schlueter, Jr. et al. | 428/58 |
| 6,261,659 B1 | 7/2001 | Fletcher et al. | 428/58 |
| 6,353,725 B1 | * 3/2002 | Swift et al. | 399/302 |
| 6,381,436 B1 | * 4/2002 | Swift et al. | 399/308 |

FOREIGN PATENT DOCUMENTS

EP    1 004 794 A1    5/2000

* cited by examiner

*Primary Examiner*—Alexander S. Thomas
(74) *Attorney, Agent, or Firm*—John M. Kelley; Joseph M. Young

(57) ABSTRACT

Imageable seamed intermediate transfer belts having a large seam surface area, and marking machines that use such imageable seam intermediate transfer belts. A belt is formed from an electrically semiconductive substrate having a first end and a second end that are mated to form a seam. The first end includes a first tongue and the second end includes a second tongue that form a rabbeted joint such that the outer surface of the belt is substantially smooth across the seam. An adhesive is disposed over the rabbeted joint. The tongues may include mechanical locking features, such a protrusion and a channel, or an interlocking puzzle-cut feature that mate. The mechanical locking features may be continuous along the seam.

20 Claims, 11 Drawing Sheets

BELTS HAVING OVERLAPPING END SECTIONS

FIELD OF THE INVENTION

This invention relates to seamed belts.

BACKGROUND OF THE INVENTION

Cross reference is made to the following applications that were filed on Sep. 29, 2000 Ser. No. 09/675,189 entitled "SEAMED BELT HAVING BEVELED END SECTIONS", Ser. No. 09/676,829 entitled "IMAGEABLE SEAM INTERMEDIATE TRANSFER BELT HAVING TONER PARTICLE SIZED KERF GAP"now U.S. Pat. No. 6,353,725, Ser. No. 09/676,122 entitled "SEAMED BELTS HAVING FILLED BACKSIDE NOTCHES"now U.S. Pat. No. 6,381,436, and Ser. No. 09/676,123 entitled "LASER MICRO-MACHINING OF SEAMED BELTS".

Electrophotographic printing is a well-known and commonly used method of copying or printing documents. Electrophotographic printing is performed by exposing a light image representation of a desired document onto a substantially uniformly charged photoreceptor. In response to that light image the photoreceptor discharges, creating an electrostatic latent image of the desired document on the photoreceptor's surface. Toner is then deposited onto that latent image, forming a toner image. The toner image is then transferred from the photoreceptor onto a receiving substrate such as a sheet of paper. The transferred toner image is then fused with the substrate, usually using heat and/or pressure. The surface of the photoreceptor is then cleaned of residual developing material and recharged in preparation for the production of another image.

The foregoing generally describes black and white electrophotographic printing machines. Electrophotographic printing can also produce color images by repeating the above process for each color of toner that is used to make the color image. For example, the photoreceptive surface may be exposed to a light image that represents a first color, say black. The resultant electrostatic latent image can then be developed with black toner particles to produce a black toner layer that is subsequently transferred onto a receiving substrate. The process can then be repeated for a second color, say yellow, then for a third color, say magenta, and finally for a fourth color, say cyan. When the toner layers are placed in superimposed registration the desired composite color toner image is formed and fused on the receiving substrate.

The color printing process described above superimposes the color toner layers directly onto a substrate. Other electrophotographic printing systems use intermediate transfer belts. In such systems successive toner layers are electrostatically transferred in superimposed registration from the photoreceptor onto an intermediate transfer belt. Only after the composite toner image is formed on the intermediate transfer belt is that image transferred and fused onto the substrate. Indeed, some electrophotographic printing systems use multiple intermediate transfer belts, transferring toner to and from the belts as required to fulfill the requirements of the machine's overall architecture. Suitable toners include both dry toner and liquid toner.

In operation, an intermediate transfer belt is brought into contact with a toner image-bearing member such as a photoreceptor belt. In the contact zone an electrostatic field generating device such as a corotron, a bias transfer roller, a bias blade, or the like creates electrostatic fields that transfer toner onto the intermediate transfer belt. Subsequently, the intermediate transfer belt is brought into contact with a receiver. A similar electrostatic field generating device then transfers toner from the intermediate transfer belt to the receiver. Depending on the system, a receiver can be another intermediate transfer member or a substrate onto which the toner will eventually be fixed. In either case the control of the electrostatic fields in and near the transfer zone is a significant factor in toner transfer.

Intermediate transfer belts often take the form of seamed belts fabricated by fastening two ends of a web material together, such as by welding, sewing, wiring, stapling, or gluing. While seamless intermediate transfer belts are possible, they require manufacturing processes that make them much more expensive than similar seamed intermediate transfer belts. This is particularly true when the intermediate transfer belt is large, for example when the size of the belt is greater than about 500 to 1000 square inches in total surface area. While seamed intermediate transfer belts are relatively low in cost, the seam introduces a discontinuity that interferes with the electrical, thermal and mechanical properties of the belt. While it is possible to synchronize a printer's operation with the motion of the intermediate transfer belt so that toner is not electrostatically transferred onto the seam, such synchronization adds to the printer's expense and complexity, resulting in loss of productivity. Additionally, since high speed electrophotographic printers typically produce images on paper sheets that are cut from a paper "web," if the seam is avoided the resulting unused portion of the paper web must be cut-out, producing waste. Furthermore, even with synchronization the mechanical problems related to the discontinuity, such as excessive cleaner wear and mechanical vibrations, still exist. Additionally, a discontinuity can act as a mechanically weak spot or region in the belt. However, because of the numerous difficulties with transferring toner onto and off of a seamed intermediate transfer belt in the prior art it was necessary to avoid toner transfer onto (and thus off of) a seam.

Acceptable intermediate transfer belts require sufficient seam strength to achieve a desired operating life. While that life depends on the specific application, typically it will be at least 100,000 operating cycles, but more preferably 1,000,000 or more cycles. Considering that a seamed intermediate transfer belt must endure mechanical stresses from belt tension, traveling over rollers, moving through transfer nips, and passing through cleaner and developer systems, achieving such a long operating life is not trivial. Thus, the conflicting constraints of long life and limited topographical size at the seam places a premium on adhesive strength and good seam construction.

A prior art "puzzle-cut" approach to seamed belts significantly improves the seam's mechanical strength. U.S. Pat. No. 5,514,436, issued May 7, 1996, entitled, "Puzzle Cut Seamed Belt;" U.S. Pat. No. 5,549,193 entitled "Endless Seamed Belt with Low Thickness Differential Between the Seam and the Rest of the Belt;" and U.S. Pat. No. 5,487,707, issued Jan. 30, 1996, entitled "Puzzle Cut Seamed Belt With Bonding Between Adjacent Surface By UV Cured Adhesive" teach the puzzle-cut approach. While the puzzle-cutstructures described in the forgoing patents beneficially improve the seam's strength, further improvements would also be beneficial. Furthermore, there are other difficulties when transferring toner onto and off of a seam of a seamed intermediate transfer belt.

For a seamed intermediate belt to be acceptable, the final image produced from across the seam must be comparable in quality to images formed across the remainder of the belt. This is a difficult task due to a number of interrelated factors. Some of those factors relate to the fact that the seam should not greatly impact the electrostatic fields used to transfer toner. However, electrostatic transfer fields are themselves dependent on the electrical properties of the intermediate transfer belt. While this dependency is complex, briefly there are conditions where transfer fields are very sensitive to the resistivity and thickness of the materials used for the various layers of the intermediate transfer belt. Under other conditions the electrostatic transfer fields are relatively insensitive to those factors. Similarly, there are conditions where the electrostatic transfer fields are very sensitive to the dielectric constants of the materials used for the layers of the intermediate transfer belt, and other conditions where the electrostatic transfer fields are insensitive to the dielectric constants. Therefore, to successfully transfer toner by electrostatic mechanisms onto and off of a seamed intermediate transfer belt the electrical properties across and around the seam should be carefully controlled to produce a proper relationship with the remainder of the belt. Since the electrical properties depend on the interrelated factors of seam geometry seam construction (such as adhesive within and beyond the seam), seam topology, seam thickness, the presence of an overcoating, and various other factors, those factors should be taken into consideration for a given application.

In addition to mechanical strength and electrical compatibility difficulties, there are other problems when transferring toner onto and off of a seam. For example, with most prior art seamed intermediate transfer belts, relatively poor cleaning around the seam was acceptable. However, if toner is being transferred onto and off of the seam region, the seam must be properly cleaned. Thus, the toner release and friction properties across the seam region have to be comparable to those of the rest of the belt. Furthermore, most prior art seamed intermediate transfer belts have a significant "step" or "bump" where the belt overlaps to form the seam. That step can be as large as 25 microns or more. Such a step significantly interferes with transfer and cleaning. Thus, if toner is transferred onto and off of the seam, the seam's friction, toner release and topography are much more constrained than those of other seamed intermediate transfer belts. Furthermore, while the step of a puzzle-cut seamed belt may be relatively small, belt tension can cause an individual puzzle-cut petal to separate and lift from around neighboring petals. Such lifting introduces localized steps that interfere with blade-based or other contacting type belt cleaners. Such interference can seriously degrade belt and cleaner life.

Therefore, it can be seen that a seam's topography is very important if one wants to transfer toner onto and off of a seam region without significant degradation of the final image. The seam topography includes not only the seam itself, but also any overflow of the adhesive used in the seam. This overflow can occur on both the toner-bearing side and the back-side of the belt. Adhesive overflow is important because the belt seam strength can depend on that overflow. However, excessive overflow increases various mechanical, electrical, and xerographic problems. Moreover, the adhesive's electrical properties remain important.

More information regarding the requirements of imageable seam intermediate transfer belts can be found in U.S. Pat. No. 6,245,402 entitled "Imageable Seam Intermediate Transfer Belt Having An Overcoat," by Edward L. Schlueter, Jr. et al., and U.S. Pat. No. 6,261,659 entitled "Imageable Seam Intermediate Transfer Belt," by Gerald M. Fletcher et al., both filed on Dec. 14, 1999. Those patent documents discuss, among other things, "short-wavelength" and "long-wavelength" spatial disturbances, conformable overcoats, Paschen air breakdown, transfer nip air gaps, suitable electrical properties, material layers, material compositions, environmental and aging concerns, cleaning, surface friction, and "set point control" approaches to enable wider tolerances in electrical properties.

The present invention is specifically related to a technique of improving a seam's mechanical properties without significantly degrading other desirable belt properties. As previously indicated, prior puzzle-cut seams are useful in achieving a strong belt seam. At least part of this strength is due to an increased seam surface area and at least part is due to an improved distribution of lateral forces. However, prior art puzzle-cut or other seams or other types of prior art seams might not be optimal in particular applications. For example, when particularly rugged belts are required, a further increase in belt seam contact area would be beneficial. Even better would be a seam joint approach that does not depend solely on adhesive strength to hold the belt together. Imageable seam intermediate transfer belts having improved seam mechanical properties are particularly desirable.

SUMMARY OF THE INVENTION

The principles of the present invention provide for seamed belts having a large seam contact area. The principles of the present invention are particularly useful in imageable seam intermediate transfer belts and in marking machines that use imageable seam intermediate transfer belts. An imageable seam intermediate transfer belt according to the present invention includes a seamed substrate having a first end and a second end that are mated to form a seam. The seam contact area is defined by the regions that come into direct contact to form the seam interface. The substrate may be of an electrically semiconductive or of another appropriate material. The first end includes a first tongue and the second end includes a second tongue that form a rabbeted joint when mated such that the outer surface of the belt is substantially smooth across the seam. Beneficially, an adhesive is disposed over the contacting surfaces of the joint. The tongues may include mechanical locking features such as a protrusion or a channel. Beneficially the mechanical locking features mate over an area that is covered with an adhesive. For example, rectangular or dovetailed protrusions may mate with matching channels. The mechanical locking features may be continuous along the seam. In practice, variations to the puzzle-cut type of seams may be beneficial.

Alternative mechanical features include a small protusion that is designed to mate with a corresponding hole. Such a feature is beneficial in automating seam manufacture.

BRIEF DESCRIPTION OF THE DRAWINGS

Other features of the present invention will become apparent as the following description proceeds and upon reference to the drawings, in which.

DETAILED DESCRIPTION OF THE INVENTION

While the principles of the present invention are described below in connection with various embodiments of imageable seam intermediate transfer belts, and with an embodiment of an electrophotographic marking machine that uses such an imageable seam intermediate transfer belt, it should be understood that the present invention is not limited to those embodiments. On the contrary, the present invention is intended to cover all alternatives, modifications, and equivalents as may be included within the spirit and scope of the appended claims.

Figure 1:
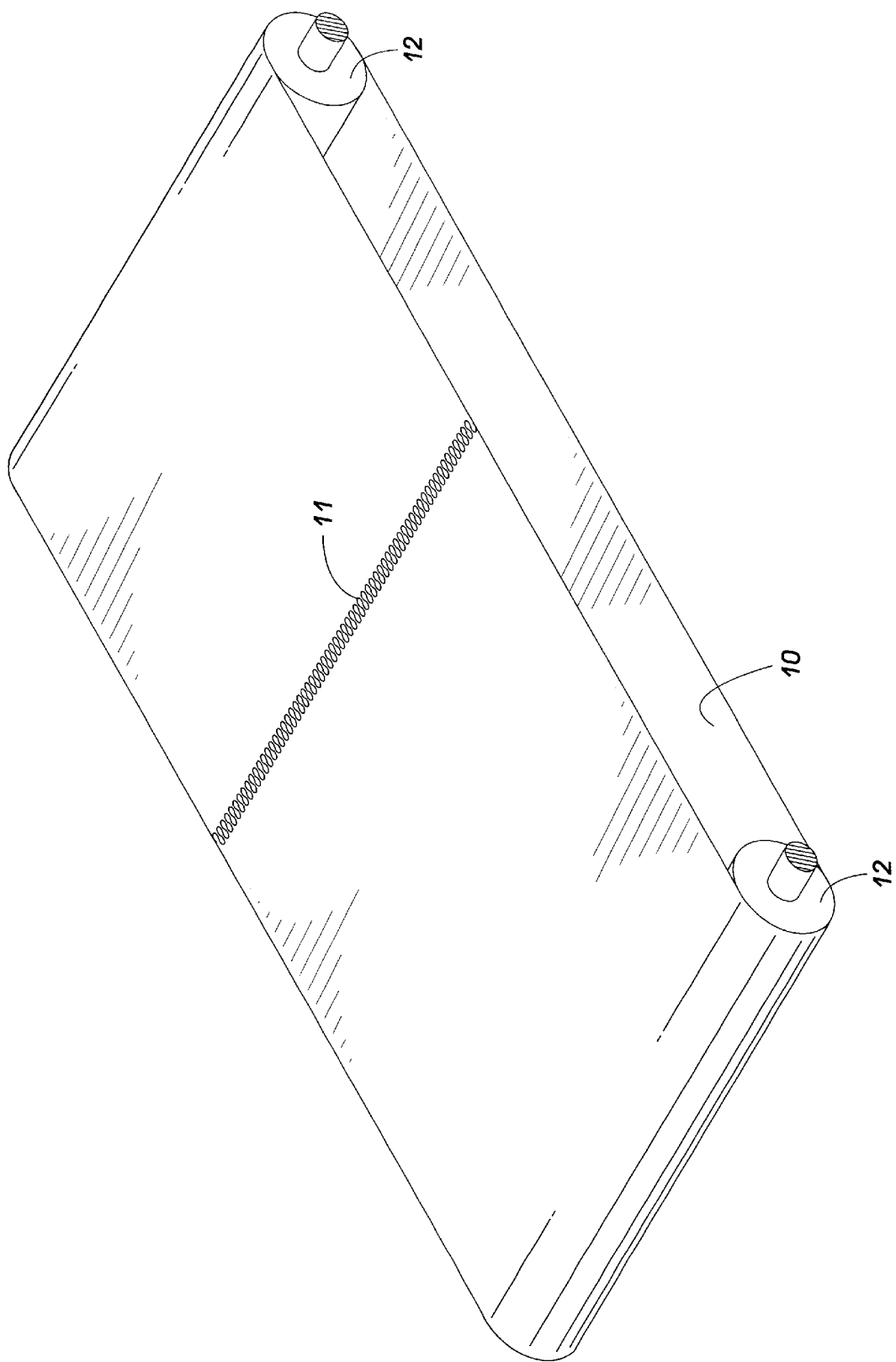
FIG. 1 is an isometric representation of a puzzle-cut seamed intermediate transfer belt.

An embodiment of an imageable seam intermediate transfer belt 8 is illustrated in FIG. 1. That belt includes a semiconductive substrate layer 10 that has its ends joined together to form a continuous belt using mechanically interlocking "puzzle-cut" tabs that form a seam 11. While the seam is illustrated as being perpendicular to the two parallel sides of the substrate layer the seam could be angled or slanted with respect to the parallel sides. Reference U.S. Pat. Nos. 5,487,707; 5,514,436; 5,549,193; and 5,721,032 for additional information on puzzle-cut patterns. Typically the seam 11 is about ¼ inch wide, but it may be smaller or larger.

The substrate layer 10 can be made from a number of different materials, including polyesters, polyurethanes, polyimides, polyvinyl chlorides, polyolefins (such as polyethylene and polypropylene) and/or polyamides (such as nylon), polycarbonates, or acrylics, or blends, or copolymers, or alloys of such materials. If required, the selected material is modified by the addition of an appropriate filler such that the substrate layer has a desired electrical conductivity. Appropriate fillers can include for example particulate carbon black, Accufluor® fluorinated carbon black, carbon fiber, and/or other appropriate fillers such as, polyanaline, and polythiophene, or other conductive fillers or polymers. Donor salts can also be used. The substrate layer may comprise one, or more layers, and the consitituent material should have the physical characteristics appropriate to an intermediate transfer application, including good tensile strength (Young's modulus, typically $1 \times 10^3$ to $1 \times 10^6$ Newton's/m$^2$, resistivity (typically less than $10^{13}$ ohm cm volume resistivity, greater than $10^8$ ohms/square lateral resistivity), thermal conductivity, thermal stability, flex strength, and high temperature longevity. See the previously referenced U.S. Pat. No. 6,245,402, entitled "Imageable Seam Intermediate Transfer Belt Having An Overcoat," by Edward L. Schlueter, Jr. et al., and U.S. Pat. No. 6,261,659 entitled "Imageable Seam Intermediate Transfer Belt," by Gerald M. Fletcher et al., both filed on Dec. 14, 1999.

Figure 2:
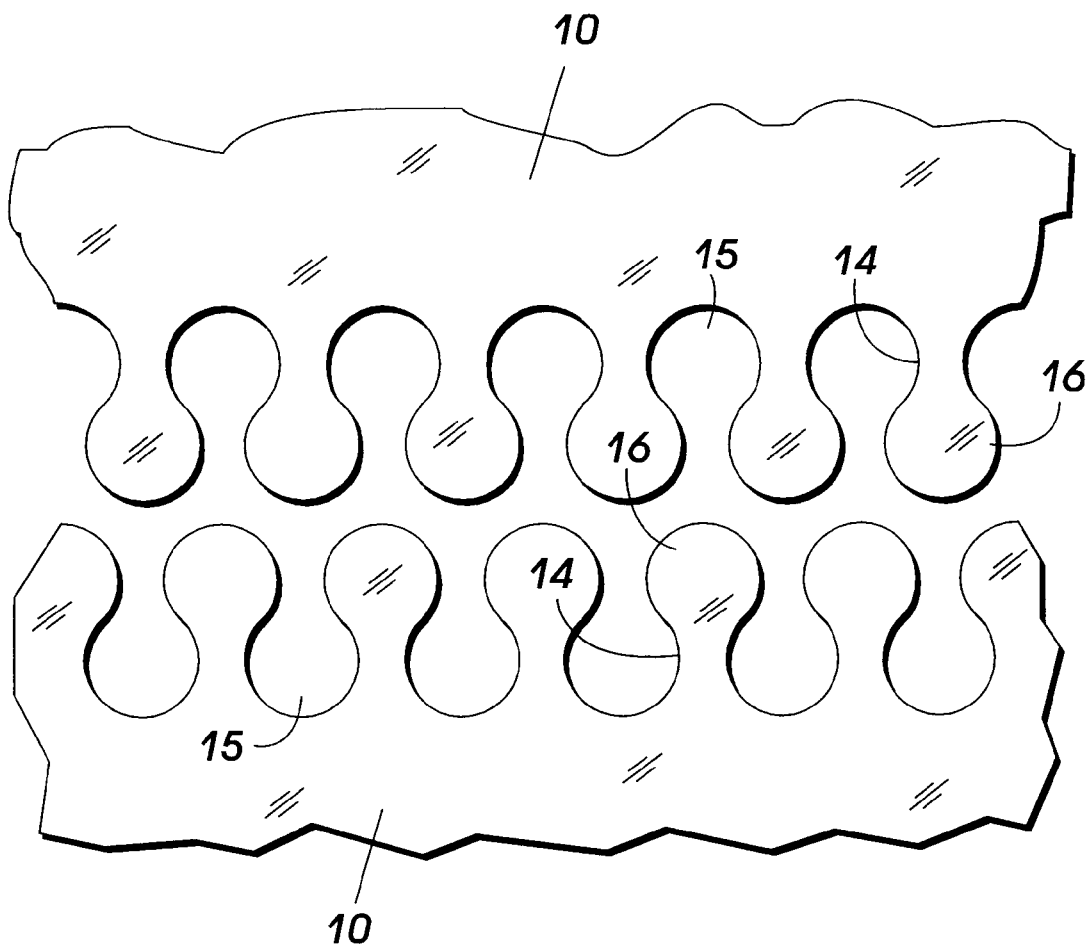
FIG. 2 is a top down view of the puzzle-cut tab pattern used in the belt of FIG. 1.

FIG. 2 shows a top view of the puzzle-cut tab pattern in more detail. Each tab is comprised of a neck 14 and a node 16 that fit into female 15 interlocking portions.

The tabs can be formed using any conventional shaping technique, such as die cutting, laser cutting, specifically by using a laser micro-machining system described subsequently, or cutting wheel. The interlocking tabs mate so as to reduce the stress concentration between the interlocking elements and to permit easy travel around curved members, such as rollers 12 shown in FIG. 1.

Figure 3:
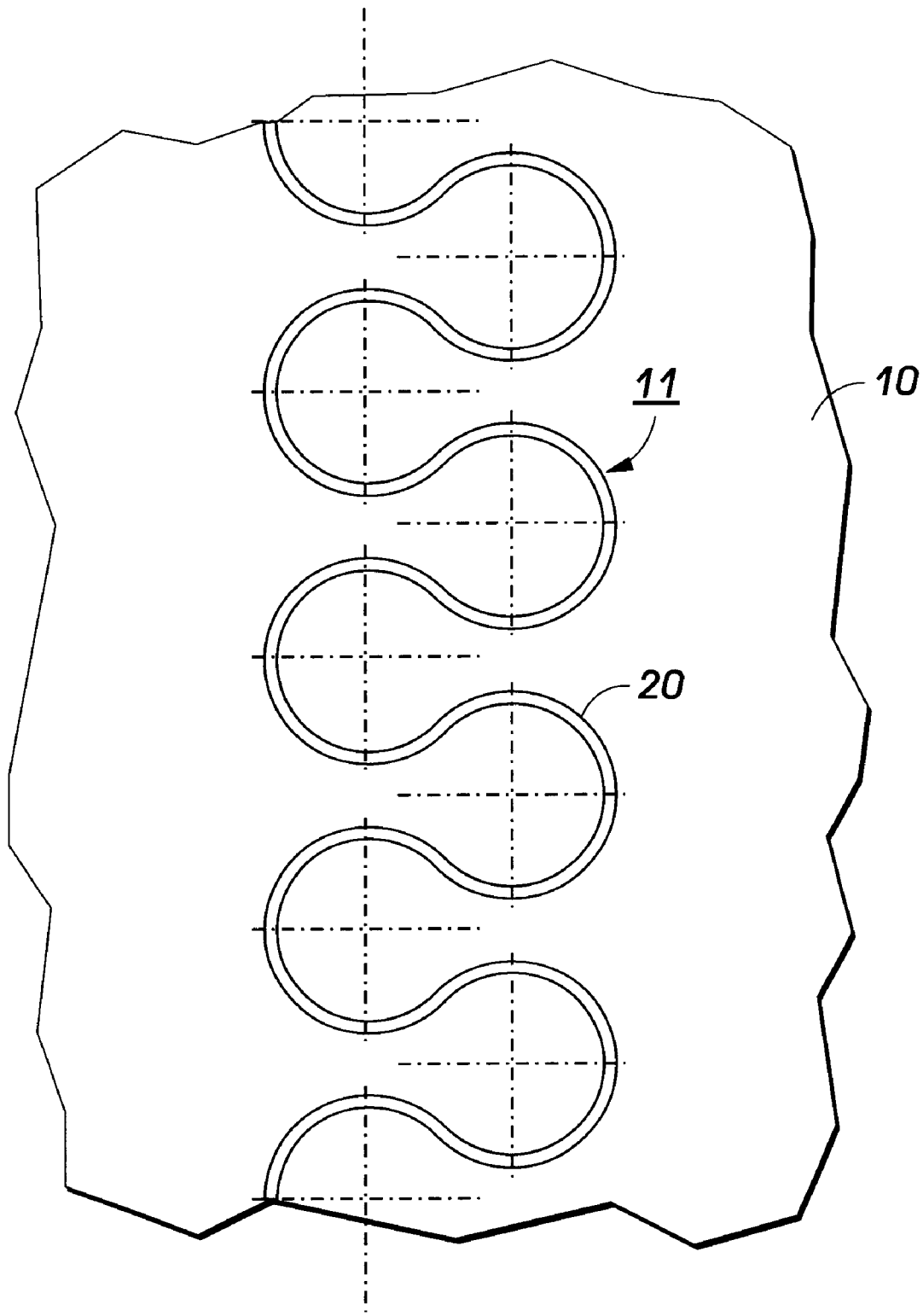
FIG. 3 shows the puzzle-cut tabs of FIG. 2 interlocked together.
Figure 4:
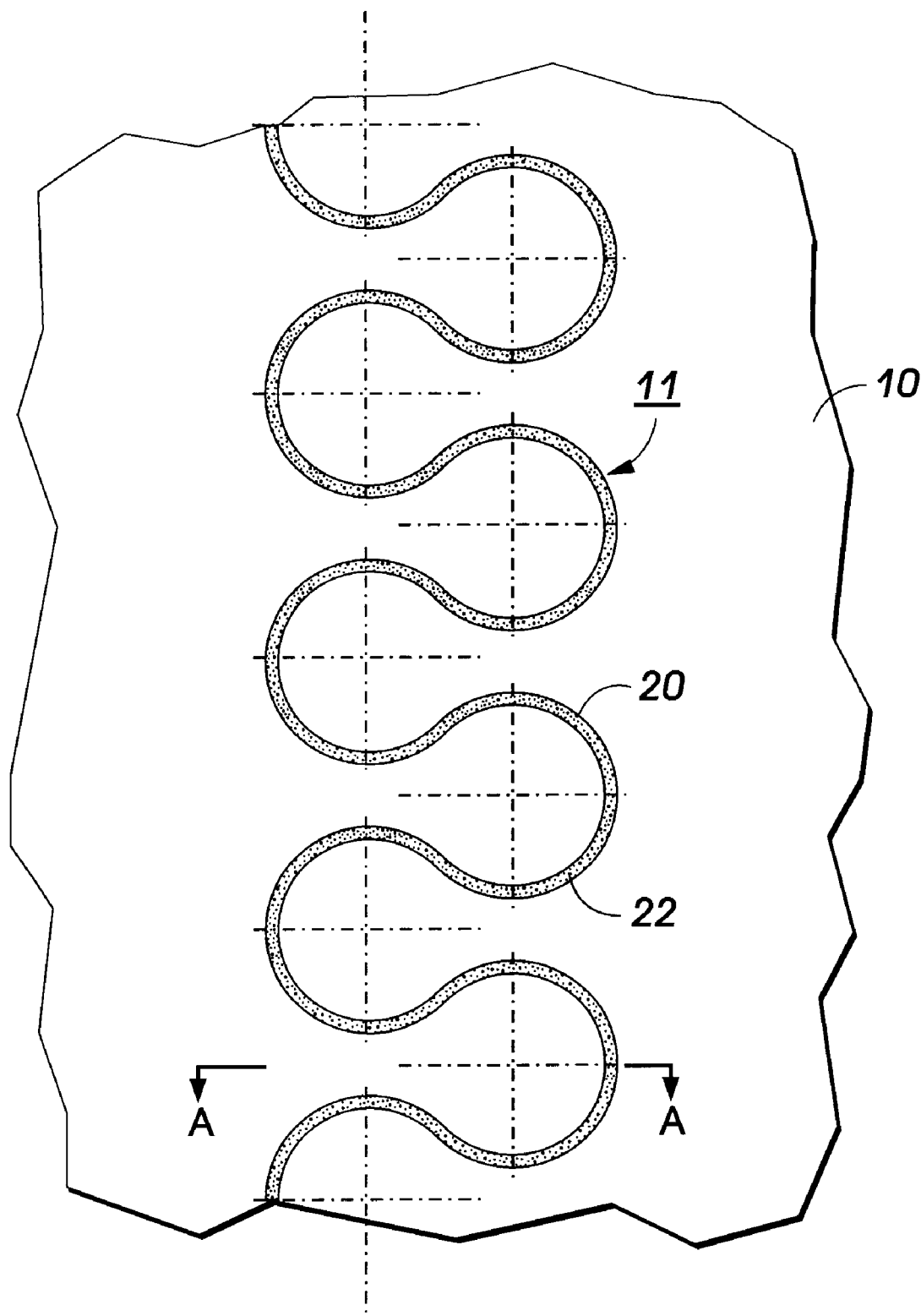
FIG. 4 shows the puzzle-cut tabs of FIG. 3 with the kerf filled with an adhesive.

FIG. 3 shows a top view of the puzzle-cut tabs of FIG. 2 interlocked together. Physically interlocking the puzzle-cut tabs may require pressure when mating the tabs. Interlocking produces a gap between the mutually mating elements that is called a kerf 20. As shown in FIG. 4 the interlocking tabs are held together using an adhesive 22 that fills the kerf. The adhesive is designed to be physically, chemically, thermally, mechanically, and electrically compatible with the substrate layer material. Seams with a 25 micron kerf have been typical for the puzzle-cut seam while a kerf less than about 5 microns can be preferred.

Significantly, the adhesive and the puzzle-cut tabs act together to create a strong seam. Ideally the seam should be strong, smooth, and mechanically uniform. Belts according to the principles of the present invention differ from those of the prior art by adding various seam complexities along a third dimension, that being perpendicular to the seam planes in FIGS. 1–4. FIG. 4 identifies a section A—A, which will generally be used to locate various alternative embodiment seam structures in FIGS. 5–10.

It should be understood that a seam structure extends along the seam, and that the adhesive 22 is disposed both along the seam and across the contacting areas within the seam structure. To that end, the adhesive should have a viscosity such that it readily wicks into the kerf and throughout the contacting interfaces. Additionally, the surface energy of the adhesive should be compatible with the substrate material such that the adhesive adequately wets and spreads. Furthermore, the adhesive should remain flexible and should adhere well to the substrate layer material. Finally, the adhesive also should have low shrinkage during curing. As an example, the adhesive can be a hot melt adhesive that is heated and pressed into the seam such that the adhesive is flattened, making it as mechanically uniform as possible with the substrate layer 10. Alternatively, the adhesive can be an epoxy-like material, a UV curable adhesives including acrylic epoxies, polyvinyl butyrals, or the like. Further, the "adhesive" can be substantially the substrate material itself, either applied during a separate adhesive application step or else by melting the two ends sufficiently to cause adhesion of the mutually mating elements. Finally, the adhesives may be electrically modified as required for the particular application. Following the application of the adhesive the seam 11 can be finished by buffing, sanding, or micro polishing to achieve a smooth topography.

The relative electrical properties of the adhesive and the substrate are very important because they significantly affect the transfer characteristics of the resulting seam as compared to the transfer characteristics of the rest of the belt. Therefore, the adhesive should produce a seam that has electrical properties that corresponds to that of the substrate layer. That is, under operating conditions a seam should create an electrostatic transfer field in the toner transfer zones that is within at least 20%, preferably within 10%, of the electrostatic transfer field that is present for the remainder of the belt. Ideally the seam electrical properties are substantially the same as the substrate layer and have substantially the same electrical property dependence as the substrate on all important factors, such environment, applied field, and aging. However, significant differences in electrical properties can be allowed for some imageable seam conditions as discussed subsequently. The adhesive electrical properties can be met by mixing fillers or additives with an adhesive. For example, an adhesive might contain silver, indium tin oxide, CuI, $SnO_2$, TCNQ, Quinoline, carbon black, NiO and/or ionic complexes such as quaternary ammonium salts, metal oxides, graphite, or like conductive fillers in particulate, flake or fiber form and conductive polymers such as polyanaline and polythiophenes.

Figure 5:
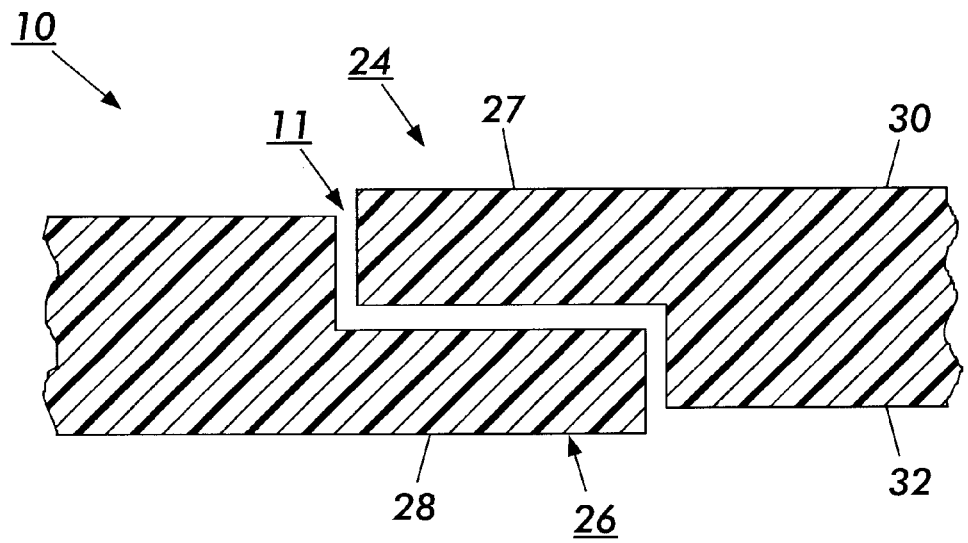
FIG. 5 shows a cross-sectional view of a first embodiment puzzle-cut seam structure that is in accord with the principles of the present invention.

FIG. 5 shows a first seam structure embodiment. The ends 24 and 26 of a belt 10 are cut to form rabbeted tongues 27 and 28 that fit together to form a seam 11 such that the outer surface 30 and the inner surface 32 of the belt are substantially flush across the seam. The inside and edge surfaces of the tongues increase the seam contact surface area, enabling the adhesive 22 to form a stronger seam.

Figure 6:
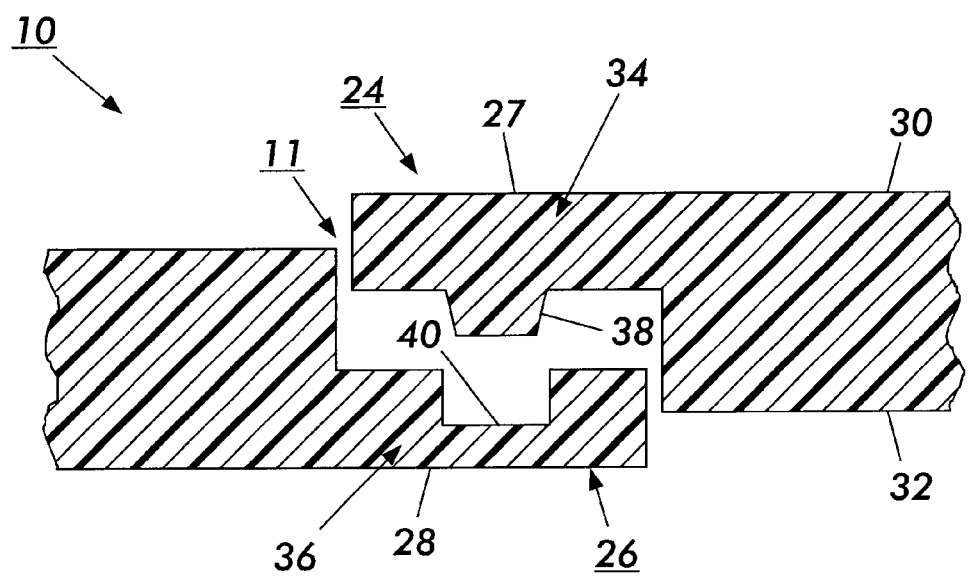
FIG. 6 shows a cross-sectional view of a second embodiment puzzle-cut seam structure that is in accord with the principles of the present invention.

FIG. 6 shows a second seam structure embodiment. Like the first seam structure, this structure includes rabbeted tongues 34 and 36 that fit together to form a seam 11 such that the outer surface 30 and the inner surface 32 of the belt are substantially flush across the seam. However, in this embodiment the tongue 34 includes a protrusion 38 that fits into a channel 40. The tongues 34 and 36 not only increase the seam's surface area, thus enabling the adhesive 22 to form a stronger seam, but the protrusion 38 and channel 40 add a mechanical impediment to seam separation. Of course, the increased seam area along the protrusion 38 also improves the strength of the seam.

Figure 7:
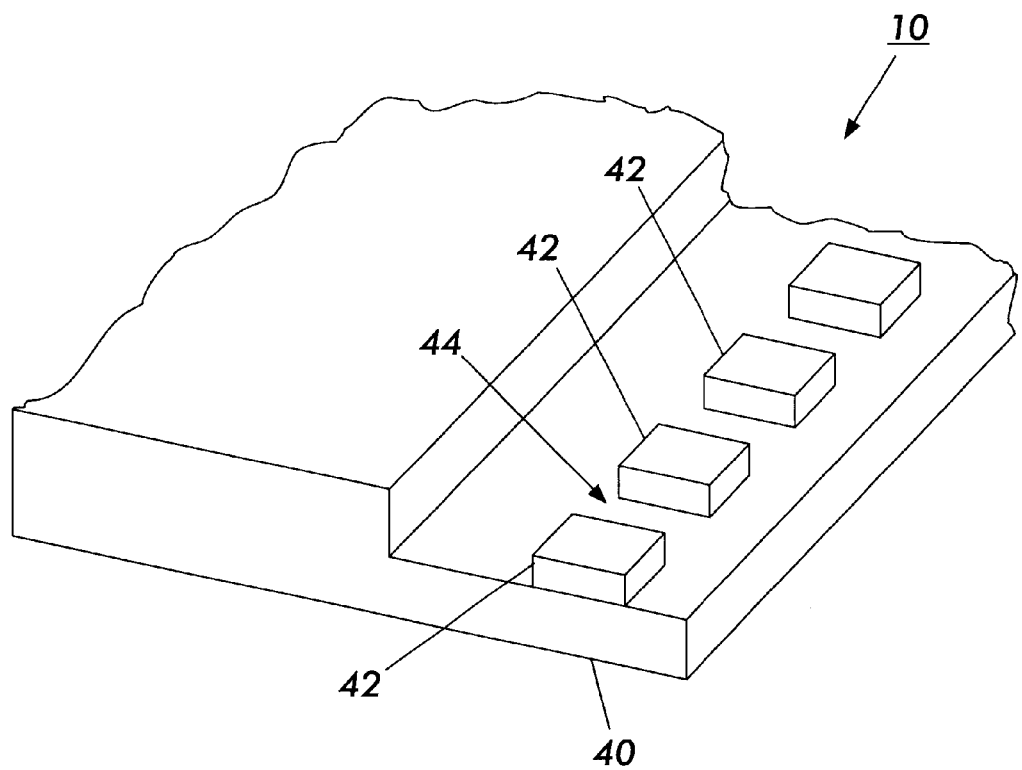
FIG. 7 shows a perspective view of a third embodiment puzzle-cut seam structure that is in accord with the principles of the present invention.

FIG. 7 helps illustrate a third seam structure embodiment, which is similar related to the second seam structure embodiment. However, instead of a continuous channel 40 and a protrusion 38, each tongue 40 includes a line of discrete protrusions 42 that are separated by gaps 44. Those protrusions are dimensioned to received similar protrusions from the other tongued end of the belt 10. Alternatively, the protrusions 42 could align with matching openings in the other tongue (thus having a cross-sectional view as shown in FIG. 6). Again, the increased seam area enables the adhesive to form a stronger seam while the protrusion 42 and gaps 44 provide for a mechanical impediment to seam separation.

Figure 8:
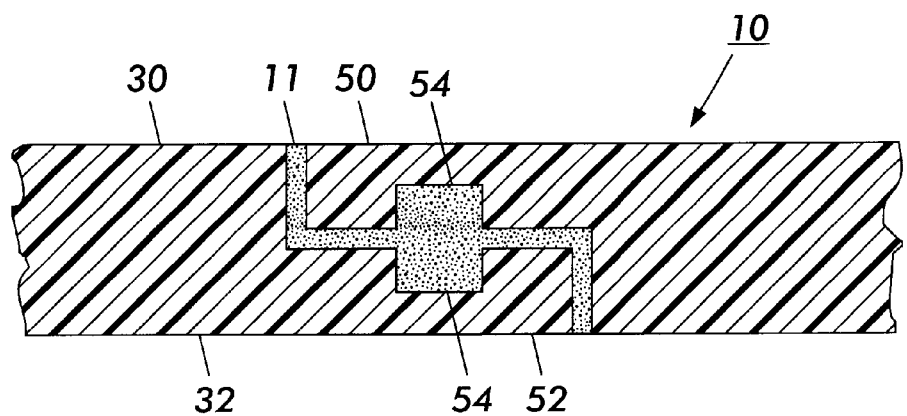
FIG. 8 shows a cross-sectional view of a fourth embodiment puzzle-cut seam structure that is in accord with the principles of the present invention.

FIG. 8 shows a fourth seam structure embodiment. Like the first seam structure embodiment, this structure includes rabbeted tongues 50 and 52 that fit together to form a seam 11 such that the outer surface 30 and the inner surface 32 of the belt are substantially flush across the seam. However, in this embodiment the tongues include channels 54 that align when the seam 11 is formed. In this embodiment the adhesive fills the matching channels 54. The increased surface area enables the adhesive to form a stronger seam, but the adhesive filled channels 54 adds a mechanical impediment to seam separation.

Figure 9:
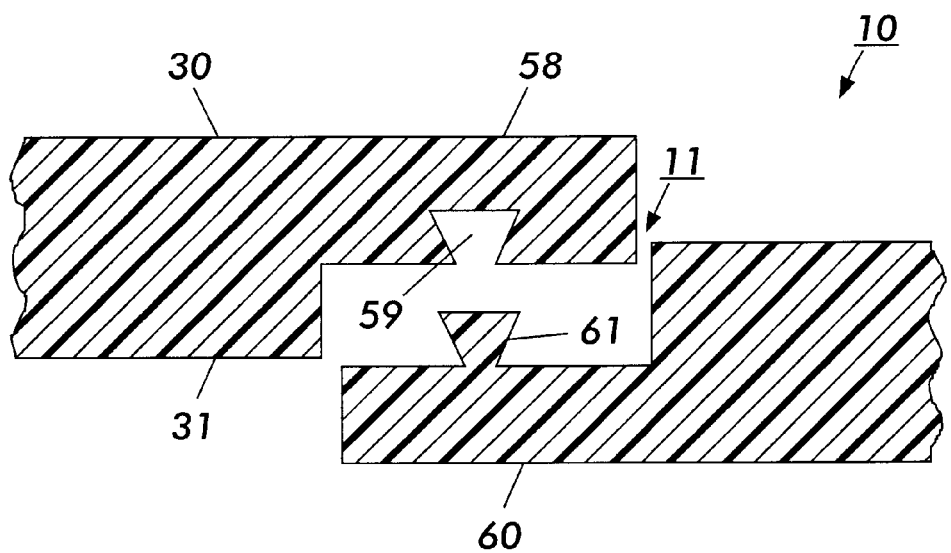
FIG. 9 shows a cross-sectional view of a fifth embodiment puzzle-cut seam structure that is in accord with the principles of the present invention.

FIG. 9 shows a fifth seam structure embodiment. Like the second seam structure embodiment, this structure includes a rabbeted tongue 58 having a channel 59 and a rabbeted tongue 60 having a protrusion 61. When the tongues fit together to form a seam 11 the protrusion 61 mates with the channel 59. Again, the outer surface 30 and the inner surface 32 of the belt 10 are substantially flush across the seam. However, in this embodiment the cross-section of protrusion 61 has a dove tail construction. Of course, mating the protrusion and the channel can be difficult unless the belt material has a high degree of compliance. In this embodiment the protrusion and channel add a significant impediment to seam separation along multiple directions.

Figure 10:
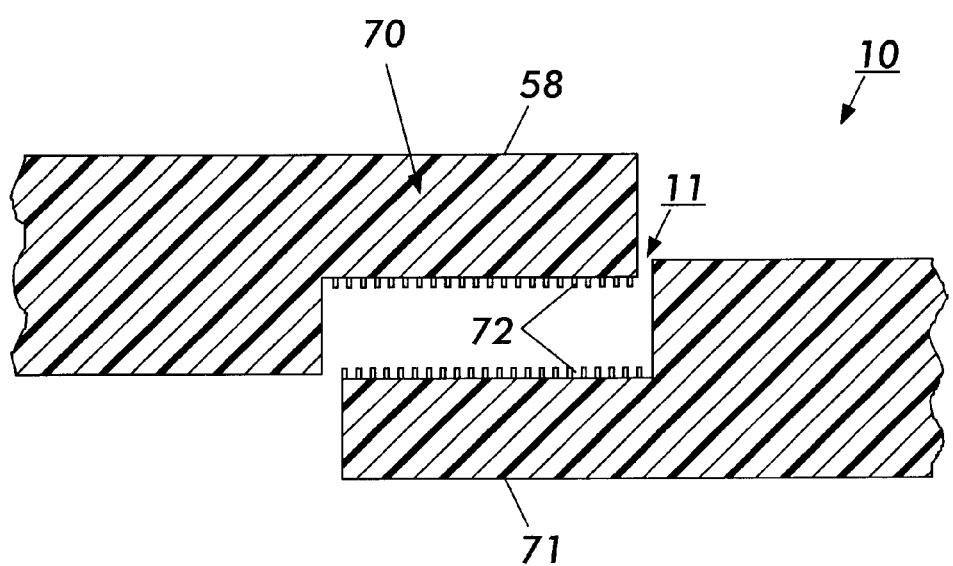
FIG. 10 shows a cross-sectional view of a sixth embodiment puzzle-cut seam structure that is in accord with the principles of the present invention.

FIG. 10 shows a sixth seam structure embodiment. This embodiment has rabbeted tongues 70 and 71 that each includes a plurality of random surface protrusions 72. When the tongues fit together they form a seam 11 such that the surface protrusions randomly "mesh," much like the meshing of two toothbrushes. This produces a high seam surface area that assists the adhesive in producing a strong seam. Furthermore, the meshed protrusions add a significant impediment to seam separation.

Figure 11:
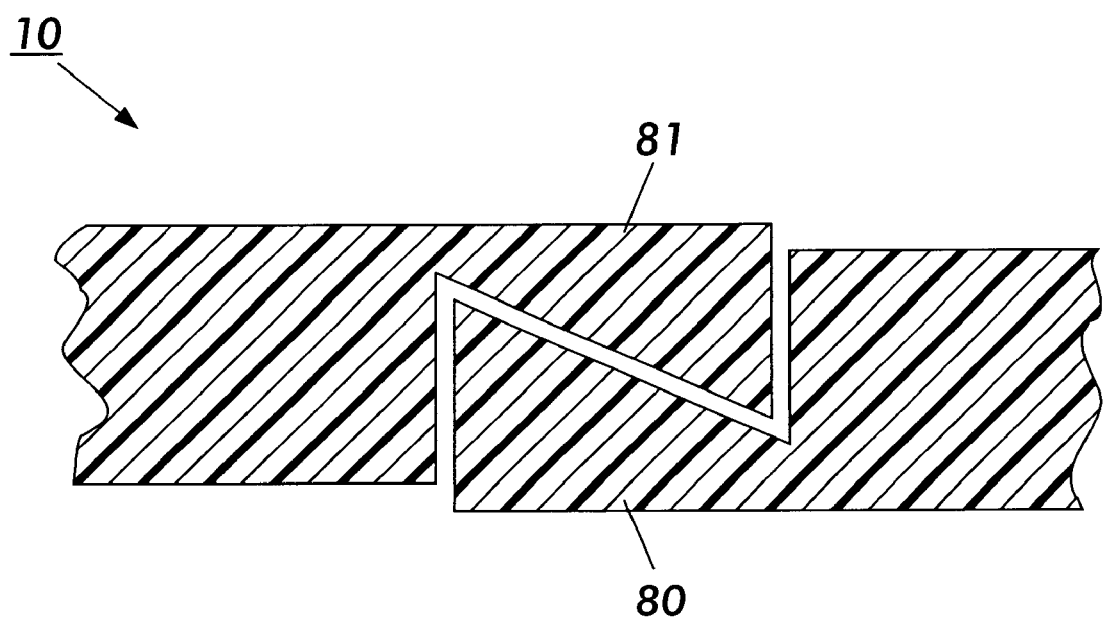
FIG. 11 shows a cross-sectional view of a seventh embodiment puzzle-cut seam structure that is in accord with the principles of the present invention.

Finally, FIG. 11 shows a seventh seam structure embodiment. This embodiment has rabbeted tongues 80 and 81 that each includes diagonally slanted contacting interfaces. When the tongues fit together they form a seam 11 such that the sloped surfaces mate readily and self-align to the proper mated alignment. This produces a high seam surface area that contributes to the strength of the seam and enables automated assembly.

Prior art puzzle-cut seamed intermediate transfer belts were usually fabricated from a blank, planar sheet of suitable belt material that was puzzle-cut, one end at a time, using an intricate and expensive mechanical puzzle-cutting die that extends across the width of the belt. This requires the belt blank to be aligned twice with the elongated die. After cutting, the ends are mechanically aligned, the puzzle-features interlocked to form a mechanically coupled seam, and a suitable adhesive is applied to the seam and cured to form a seamed belt. It is possible to modify this prior art process to produce 3-dimensional seam structures (see FIGS. 5–11), for example by including cutting, etching, grinding, or milling steps before interlocking the seam. However, the resulting process is slow, labor intensive, and not suitable for large scale, low cost manufacturing.

A second prior art puzzle-cut seamed intermediate transfer belt fabrication process uses a laser to simultaneously cut two edges of a continuously fed web of suitable material. However, that process is not suitable for producing 3-dimensional features.

Figure 12:
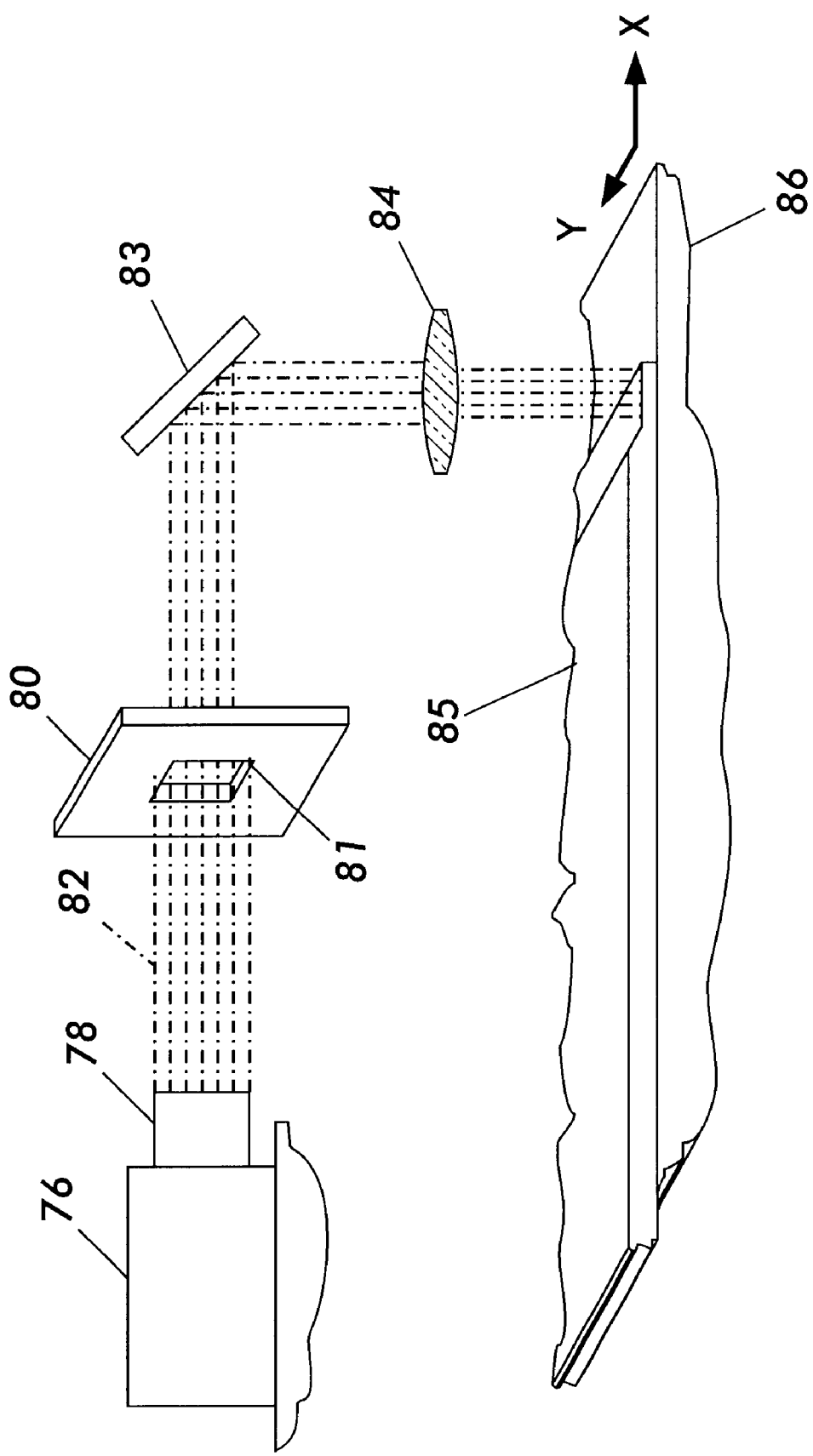
FIG. 12 shows a perspective, schematic view of a laser micro-machining system that is suitable for producing puzzle-cut seam structures.

One relatively simple, low cost process for continuous manufacture of puzzle cut seamed intermediate transfer belts having 3-dimensional seam structures is laser micro-machining. FIG. 12 is a perspective, schematic view of a suitable laser micromachining system.

As shown in FIG. 12, a fixed laser 76 having beam-spreading optics 78 illuminates a quartz glass mirrored-surface 80 (or thin metal mask) bearing a mask 81 having a desired cutting pattern with a laser beam 82. The laser beam 82 passes through the mask only in the desired cutting pattern. Typically, the mask features are 2–10 times larger than the actual desired cutting pattern. For convenience, a mirror 83 directs the laser beam along a desired path. A focusing and de-magnification lens 84 is appropriately positioned in the desired path between the mask 80 and a belt substrate 85 that is being micro-machined. The lens 84 appropriately de-magnifies the cutting pattern such that the desired features can be cut into the belt substrate. The mask pattern causes the belt substrate to be illuminated with the shape of one or more features that are to be produced. For example, a rectangular cut can be laser milled in the belt edge by illuminating the belt substrate appropriately. A feature can be continuously cut across the width of the belt by moving the belt material using a vacuum stage X-Y platform 86, or by using some other suitable apparatus.

Complex features can be cut using two or more masks, each mask having an appropriately sized feature. Features can then be successively aligned to produce the complex feature. For example, one mask might be used to cut a step along an edge of a belt substrate during a first pass, and then another mask might cut an embedded profile within that step during a sequential pass. Furthermore, the laser micromachining process might use only one laser to process both ends of the belt, or plural lasers might be used. For example, a laser might be dedicated to each end of the belt, and/or multiple lasers might work on each end.

In any event, after the belt is laser micro-machined a suitable adhesive is placed over or otherwise applied to the mating surfaces, the puzzle-cut seams and their seam structures are interlocked, and then the adhesive is cured or dried.

As will be readily understood by those skilled in the appropriate arts, the optimum laser system, energy density, and/or pulse repetition rates will depend upon the particular application. Significant variables include the particular belt material and its thickness, the required cutting/milling rate, the belt material motion, the pattern being produced, and the required feature accuracy. However, to provide a starting point, an ultraviolet (UV) laser having a wavelength of 248 nm or 192 nm will generally be suitable for cutting belts of polyaniline and carbon-black filled polyimide substrates, including those having polyanaline and or zero filled polyimide films. Suitable lasers include Excimer and triple frequency multiplied YAG lasers (which are believed capable of effectively producing suitable UV frequencies).

Figure 13:
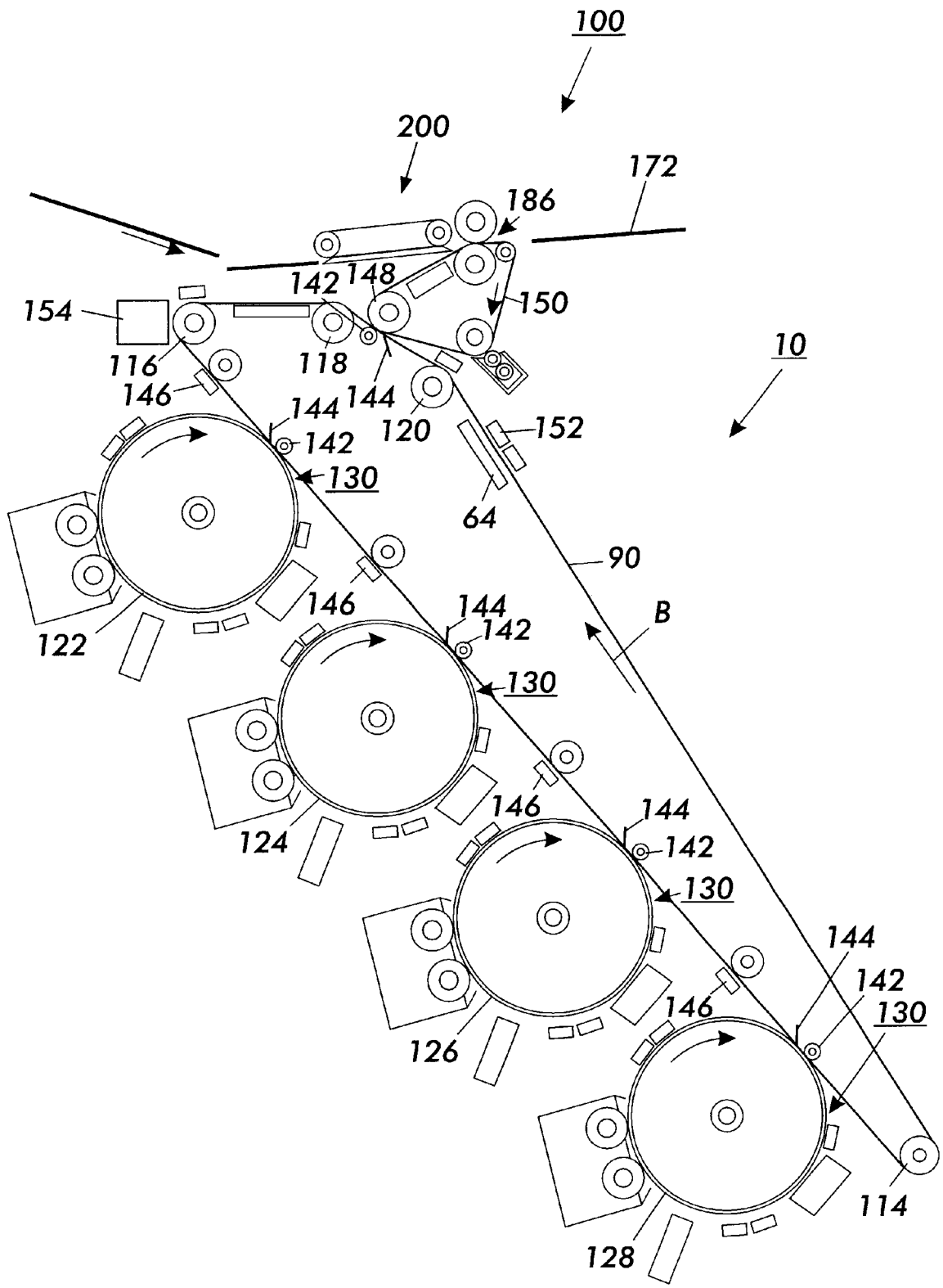
FIG. 13 illustrates an electrophotographic marking machine that includes a puzzle-cut seamed intermediate transfer belt that is in accord with the principles of the present invention.
Figure 14:
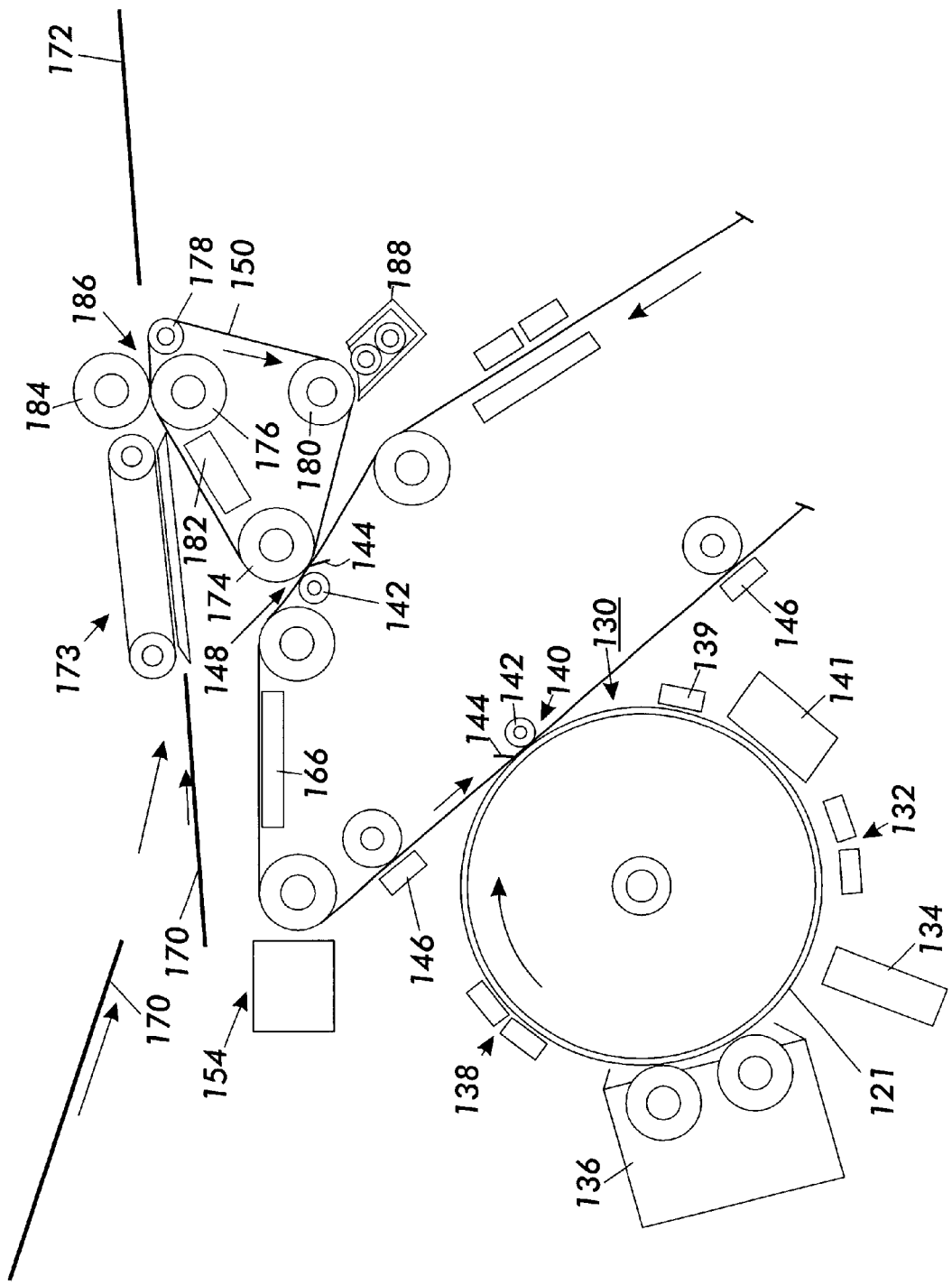
FIG. 14 is an enlarged schematic depiction of a fusing station used in the color electrophotographic marking machine of FIG. 13.

An electrophotographic marking machine 100 that makes beneficial use of imageable seam intermediate transfer belts is illustrated in FIGS. 13 and 14. With reference to those figures the electrostatographic printer 100 includes an imageable seam intermediate transfer belt 90 that is driven over guide rollers 114, 116, 118, and 120. The imageable seam intermediate transfer belt is formed using rabbeted tongues, beneficially in accord with any of FIGS. 5–11. The imageable seam intermediate transfer belt 90 moves in a process direction shown by the arrow B. For purposes of discussion, the imageable seam intermediate transfer belt includes sections that will be referred to as toner areas. A toner area is that part of the intermediate transfer belt that receives actions from the various stations positioned around the imageable seam intermediate transfer belt. While the imageable seam intermediate transfer belt may have multiple toner areas each toner area is processed in the same way.

A toner area is moved past a set of four toner image stations 122, 124, 126, and 128. Each toner image station operates to place a unique color toner image on the toner image of the imageable seam intermediate transfer belt 90. Each toner image producing station operates in the same manner to form developed toner image for transfer to the imageable seam intermediate transfer belt.

While the image producing stations 122, 124, 126, 128 are described in terms of photoreceptive systems, they may also be ionographic systems or other marking systems that form developed toner images. Each toner image producing station 122, 124, 126, 128 has an image bearing member 130. The image bearing member 130 is a drum supporting a photoreceptor 121 (see FIG. 14).

Turn now to FIG. 14, which shows an exemplary toner image producing station. That image bearing station generically represents each of the toner image producing station 122, 124, 126, 128. As shown, the photoreceptor 121 is uniformly charged at a charging station 132. The charging station is of well-known construction, having charge generation devices such as corotrons or corotrons for distribution of an even charge on the surface of the image bearing member. An exposure station 134 exposes the charged photoreceptor 121 in an image-wise fashion to form an electrostatic latent image on an image area. The image area is that part of the image bearing member which receives the various processes by the stations positioned around the image bearing member 130. The image bearing member may have multiple image areas; however, each image area is processed in the same way.

The exposure station 134 preferably has a laser emitting a modulated laser beam. The exposure station then raster scans the modulated laser beam onto the charged image area. The exposure station 134 can alternately employ LED arrays or other arrangements known in the art to generate a light image representation that is projected onto the image area of the photoreceptor 121. The exposure station 134 exposes a light image representation of one color component of a composite color image onto the image area to form a first electrostatic latent image. Each of the toner image producing stations 122, 124, 126, 128 will form an electrostatic latent image corresponding to a particular color component of a composite color image.

The exposed image area is then advanced to a development station 136. The developer station 136 has a developer corresponding to the color component of the composite color image. Typically, therefore, individual toner image producing stations 122, 124, 126, and 128 will individually develop the cyan, magenta, yellow, and black that make up a typical composite color image. Additional toner image producing stations can be provided for additional or alternate colors including highlight colors or other custom colors. Therefore, each of the toner image producing stations 122, 124, 126, 128 develops a component toner image for transfer to the toner area of the imageable seam intermediate transfer belt 90. The developer station 136 preferably develops the latent image with a charged dry toner powder to form the developed component toner image. The developer can employ a magnetic toner brush or other well-known development arrangements.

The image area having the component toner image then advances to the pretransfer station 138. The pretransfer station 138 preferably has a pretransfer charging device to charge the component toner image and to achieve some leveling of the surface voltage above the photoreceptor 121 to improve transfer of the component image from the image bearing member 130 to the imageable seamed intermediate transfer member 90. Alternatively the pretransfer station 138 can use a pretransfer light to level the surface voltage above the photoreceptor 121. Furthermore, this can be used in cooperation with a pretransfer charging device.

The image area then advances to a transfer nip 140 defined between the image bearing member 130 and the imageable seam intermediate transfer belt 90. The image bearing member 130 and imageable seam intermediate transfer belt are synchronized such that each has substantially the same linear velocity at the first transfer nip 140. The component toner image is then electrostatically transferred from the image bearing member 130 to the imageable seam intermediate transfer belt by use of a field generation station 142. The field generation station 142 is preferably a bias roller that is electrically biased to create sufficient electrostatic fields of a polarity opposite that of the component toner image to thereby transfer the component toner image to the imageable seam intermediate transfer belt. Alternatively the field generation station can be a corona device or other various types of field generation systems known in the art. A pre nip transfer blade 144 mechanically biases the imageable seam intermediate transfer belt 90 against the image bearing member 130 for improved transfer of the component toner image.

After transfer of the component toner image, the image bearing member 130 then continues to move the image area past a preclean station 139. The preclean station employs a pre clean corotron to condition the toner charge and the charge of the photoreceptor 121 to enable improved cleaning of the image area. The image area then further advances to a cleaning station 141. The cleaning station 141 removes the residual toner or debris from the image area. The cleaning station 141 preferably has blades to wipe the residual toner particles from the image area. Alternately the cleaning station 141 can employ an electrostatic brush cleaner or other well-know cleaning systems. The operation of the cleaning station 141 completes the toner image production for each of the toner image producing stations.

Turning back to FIG. 13, the individual toner image producing stations 122, 124, 126, and 128 each transfer their toner images onto the imageable seam intermediate transfer belt 90. A first component toner image is advanced onto the imageable seam intermediate transfer belt at the transfer nip of the image producing station 122. Prior to the toner area arriving at that transfer nip the toner area is uniformly charged by a conditioning station 146. This reduces the impact of any stray, low or oppositely charged toner that might result in back transfer of toner into the image producing station 122. Such a conditioning station is positioned before each transfer nip.

The toner images from the individual toner image producing stations 122, 124, 126, and 128 are transferred such that the images are registered. That is, each of the individual color component images are transferred onto the imageable seam intermediate transfer belt 90 such that the human eyes perceives a desired composite color image.

The imageable seam intermediate transfer belt 90 then transports the composite toner image to a pre-transfer charge conditioning station 152 that levels the charges at the toner area of the imageable seam intermediate transfer belt and prepares them for transfer to a transfuse member 150. The pre-transfer charge conditioning station 152 is preferably a corotron. A second transfer nip 148 is defined between the imageable seam intermediate transfer belt 90 and the transfuse member 150. A field generation station 142 and a pre-transfer nip blade 144 engage the imageabile seam intermediate transfer belt and perform similar functions as the field generation stations 142 and pre-transfer blades 144 adjacent the transfer nips 140. The composite toner image is then transferred electrostatically onto the transfulse member 150.

The transfer of the composite toner image at the second transfer nip 148 can be heat assisted if the temperature of the transfulse member 150 is maintained at a sufficiently high optimized level and the temperature of the imageable seam intermediate transfer belt 90 is maintained at a considerably lower optimized level prior to the second transfer nip 148. The mechanism for heat assisted transfer is thought to be softening of the composite toner image during the dwell time of contact of the toner in the second transfer nip 148. This composite toner softening results in increased adhesion of the composite toner image toward the transfuise member 150 at the interface between the composite toner image and the transfuise member. This also results in increased cohesion of the layered toner pile of the composite toner image. The temperature on the imageable seam intermediate transfer belt prior to the second transfer nip 148 needs to be sufficiently low to avoid too high a toner softening and too high a resultant adhesion of the toner to the imageable seam intermediate transfer belt. The temperature of the transfuise member should be considerably higher than the toner softening point prior to the second transfer nip to insure optimum heat assist in the second transfer nip 148. Further, the temperature of the imageable seam intermediate transfer belt 90 just prior to the second transfer nip 148 should be considerably lower than the temperature of the transfuise member 150 for optimum transfer in the second transfer nip 148.

Turning now again to FIG. 14, the transfulse member 150 is guided in a cyclical path by guide rollers 174, 176, 178, 180. Guide rollers 174, 176 alone or together are preferably heated to thereby heat the transfuise member 150. The imageable seam intermediate transfer belt 90 and transfuse member 150 are preferably synchronized to have the generally same velocity in the transfer nip 148. Additional heating of the transfuse member is provided by a heating station 182. The heating station 182 is preferably formed of infra-red lamps positioned internally to the path defined by the transfuse member 150. The transfuse member 150 and a pressure roller 184 form a third transfer nip 186.

A releasing agent applicator 188 applies a controlled quantity of a releasing material, such as a silicone oil to the surface of the transfuse member 150. The releasing agent serves to assist in release of the composite toner image from the transfuse member 150 in the third transfer nip 186.

The transfuse member 150 preferably has a top most layer formed of a material having a low surface energy, for example silicone elastomer, fluoroelastomers such as Viton™, polytetrafluoroethylene, perfluoralkane, and other fluorinated polymers. The transfuse member 150 will preferably have intermediate layers between the top most and back layers constructed of a Viton™ or silicone with carbon or other conductivity enhancing additives to achieve the desired electrical properties. The back layer is preferably a fabric modified to have the desired electrical properties. Alternatively the back layer can be a metal such as stainless steel.

A substrate 170 is then advanced toward the third transfer nip 186. The substrate 170 is transported and registered by a material feed and registration system into a substrate pre-heater 173. The substrate pre-heater 173 includes a transport belt that moves the substrate 170 over a heated platen. The heated substrate 170 is then directed into the third transfer nip 186.

At the third transfer nip the composite toner image is transferred and fused to the substrate 170 by heat and pressure to form a completed document 172. The document 172 is then directed into a sheet stacker or other well know document handing system (not shown).

A cooling station 166 cools the imageable seam intermediate transfer belt 90 after the second transfer nip 148. A cleaning station 154 engages the imageable seam intermediate transfer belt and removes oil, toner or debris that may be remain onto the imageable seam intermediate transfer belt. The cleaning station 154 is preferably a cleaning blade alone or in combination with an electrostatic brush cleaner, or a cleaning web.

While the foregoing is sufficient to understand the general operation of electrophotographic printing machines that use imageable seam intermediate transfer belts, practical systems are somewhat difficult to achieve. This is because imageable seam intermediate transfer belts that produce acceptable final images, such as the imageable seam intermediate transfer belt 90, are subject to numerous electrical and mechanical constraints, limitations, and design problems. More detailed discussions of those constraints, limitations, and design problems are found in U.S. Pat. No. 6,745,402 entitled, "Imageable Seam Intermediate Transfer Belt Having An Overcoat," in U.S. Pat. No. 6,261,659 entitled "Imageable Seam Intermediate Transfer Belt," both filed on Dec. 14, 1999, and in U.S. Pat. No. 6,311,036, entitled "Electrophotographic Marking Machine Having An inageable Seam Intermediate Transfer Belt," filed on Aug. 8, 2000.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An imageable seamed intermediate transfer belt having an outer surface and an inner surface, comprising:
    a seamed electrically semiconductive substrate having a first end and a second end that are joined together to form a seam, wherein said first end includes a first tongue having a dove-tailed protrusion and said second end includes a second tongue having a channel, wherein said first tongue and said second tongue form a rabbeted joint, wherein said protrusion mates with said channel, and wherein the outer surface is substantially smooth across said seam.

2. An imageable seamed intermediate transfer belt according to claim 1, wherein an adhesive is disposed over said rabbeted joint.

3. An imageable seamed intermediate transfer belt according to claim 1, wherein said first tongue includes a protrusion.

4. An imageable seam intermediate belt according to claim 1, wherein said channel is continuous along said seam.

5. An imageable seamed intermediate transfer belt according to claim 1, wherein said first tongue includes a plurality of protrusions separated by gaps.

6. An imageable seamed intermediate transfer belt according to claim 5, wherein said second tongue includes a plurality of protrusions that are mated with said gaps.

7. An imageable seam intermediate transfer belt having an outer surface and an inner surface, comprising:
    a seamed electrically semiconductive substrate having a first end and a second end that are joined together to form a seam, wherein said first end includes a first tongue having a first channel and said second end includes a second tongue having a second channel, wherein said first tongue and said second tongue flora a rabbeted joint, wherein said first channel and said second channel are filled with adhesive, and wherein the outer surface is substantially smooth across said seam.

8. A marking machine, comprising:
    a moving photoreceptor belt;
    a charging station for charging said photoreceptor belt;
    an imaging station for exposing said charged photoreceptor belt so as to produce a latent image;
    a developer for depositing toner on said latent image;
    a transfer station for transferring said deposited toner onto a substrate, said transfer station including an intermediate transfer belt that receives toner from said charging station;
    a fusser having a fusing member for receiving toner from said intermediate transfer belt and for fusing said transferred toner to said substrate; and
    a cleaning station for cleaning said photoreceptor;
    wherein said intermediate transfer belt comprises a seamed semiconductive substrate having a puzzle-cut first end and a puzzle-cut second end that are joined together to form a seam, wherein said first end includes a first tongue and said second end includes a second tongue, wherein said first tongue and said second tongue form a rabbeted joint, and wherein the outer surface is substantially smooth across said seam.

9. A marking machine according to claim 8, wherein an adhesive is disposed over said rabbeted joint.

10. A marking machine according to claim 8, wherein said first tongue includes a protrusion.

11. A marking machine according to claim 10, wherein said second tongue includes a channel.

12. A marking machine according to claim 11, wherein said protrusion is mated with said channel.

13. A marking machine according to claim 12, wherein said protrusion is dove-tailed.

14. A marking machine according to claim 12, wherein said channel is continuous along said seam.

15. A marking machine according to claim 8, wherein said first tongue includes a plurality of protrusions separated by gaps.

16. A marking machine according to claim 15, wherein said second tongue includes a plurality of protrusions that are mated with said gaps.

17. A marking machine according to claim 8, wherein said first tongue includes a first channel.

18. A marking machine according to claim 17, wherein said second tongue includes a second channel.

19. A marking machine according to claim 18, wherein said first channel and said second channel are filled with adhesive.

20. A belt having an outer surface and an inner surface, comprising:
    a seamed substrate having a first end and a second end that are joined together to form a seam, wherein said first end includes a first tongue having a dove-tailed protrusion and said second end includes a second tongue having a channel, wherein said first tongue and said second tongue form a rabbeted joint, wherein said protrusion mates want said channel, and wherein the outer surface is substantially smooth across said seam.

* * * * *